United States Patent [19]

Steinkuhl

[11] 4,142,812
[45] Mar. 6, 1979

[54] SCRAPER-CHAIN CONVEYORS

[75] Inventor: Bernd Steinkuhl, Lünen, Fed. Rep. of Germany

[73] Assignee: Gewerkschaft Eisenhutte Westfalia, Westfalia, Fed. Rep. of Germany

[21] Appl. No.: 664,580

[22] Filed: Mar. 8, 1976

[30] Foreign Application Priority Data

Mar. 7, 1975 [DE] Fed. Rep. of Germany ....... 2509921

[51] Int. Cl.$^2$ .......................... F16B 7/00; F16B 12/36; B65G 19/22
[52] U.S. Cl. .................................. 403/292; 403/294; 403/317; 198/735
[58] Field of Search ..................... 64/6, 1, 4; 403/292, 403/294, 316, 317, 155, 154, 14; 198/735, 862

[56] References Cited

U.S. PATENT DOCUMENTS

| 1,016,748 | 2/1912 | Howland | 403/292 |
| 2,468,182 | 4/1949 | Dempsey | 403/292 |
| 3,053,559 | 9/1962 | Frick | 403/292 |
| 3,583,552 | 6/1971 | Renwick | 198/735 |

FOREIGN PATENT DOCUMENTS

| 1040452 | 10/1958 | Fed. Rep. of Germany | 198/735 |
| 773513 | 4/1957 | United Kingdom | 198/735 |

Primary Examiner—Benjamin W. Wyche
Assistant Examiner—R. C. Turner
Attorney, Agent, or Firm—Thompson, Birch, Gauthier & Samuels

[57] ABSTRACT

A scraper-chain conveyor is composed of a series of channel sections arranged end-to-end with shaped components on one side defining a guide for a machine such as a plough. Each component has a tubular track or rail at its upper end and these rails are spaced apart to receive coupling devices. Each device has a cylindrical body matching the rail profile and located between adjacent rails. Spigots engage with clearance in these rails; one spigot being integral with the body and the other spigot being slidable within the body so as to retract or extend therefrom. A recess in the body receives a block which is detachably secured to the body to prevent the slidable spigot from retracting.

17 Claims, 4 Drawing Figures

SCRAPER-CHAIN CONVEYORS

BACKGROUND TO THE INVENTION

The present invention relates in general to scraper-chain conveyors and more particularly to a coupling device usable with such conveyors.

As is known, scraper-chain conveyors are usually composed of individual pans or channel sections arranged end-to-end and interconnected at their ends. In order to guide a machine such as a plough on the conveyor a guide composed of components each attached to one side of one of the channel sections is provided. Many types of guide are known. One form of guide employs a rail at its upper end formed by tubular portions of the components attached to the channel sections. In order to secure the guide componnets together their tubular portions can be connected together. For this purpose it is known to utilize a rod or bolt which extends inside these portions and is secured thereto with cotter pins. Such a connection does not allow the components to move in relation to one another and damage can result if high loads are imparted thereto. The detachment of such connections also present difficulties since the cotter pins can become deformed or rusted into the tubular portions.

A general object of this invention is to provide an improved coupling device for interconnecting guide components of a scraper-chain conveyor.

SUMMARY OF THE INVENTION

According to the invention there is provided a coupling device for interconnecting spaced-apart hollow portions of a guide formed at one side of a scraper-chain conveyor; said device comprising spigots engageable in the hollow portions with at least one of the spigots being displaceable in relation to the other to permit the device to be introduced between the hollow portions and said at least one spigot to be then engaged into the associated hollow portion and a detachable locking member for securing said at least one spigot when located in the associated hollow portion.

The invention also provides a scraper-chain conveyor for use in mining which is composed of a plurality of channel sections arranged end-to-end, each channel section having a shaped component on one side which has a tubular portion at its upper end, the shaped components combining to form a guide for a machine movable along the conveyor and connecting means for interconnecting the shaped components of adjacent channel sections, the connecting means comprising a plurality of coupling devices each having spigots engageable in the tubular portions of an adjacent pair of components at least one of these spigots being displaceable in relation to the other to permit the device to be reduced in overall length to facilitate introduction of the device between the tubular portions and to permit the displaceable spigot to be engaged into one of the tubular portions when the device has been so introduced and each device being provided with a detachable locking member to secure the movble spigot when located in the tubular portion associated therewith.

Each coupling device can be of robust construction and preferably there is an annular gap or clearance between each spigot and the inner surface of the tubular portion in which it is received. This allows some movement between the channel sections and/or the guide components. To facilitate entry of the spigots they preferably have tapered end portions.

In one constructional form each coupling device is provided with a body with a fixed spigot formed integrally therein and a movable spigot which can be slidably extended from and retracted into the body. The body can be cylindrical with an external shape which at least partly matches the exterior of the tubular portions so as to preserve the continuity of the guide when the device is installed. Preferably the locking members is easily and quickly installed or removed. Locking elements, such as pins, can be engaged in holes in the locking members and the coupling device and can be removed when desired.

To facilitate the installation and removal of the locking member the body of each coupling device can have a recess in its wall which permits the locking member to be introduced laterally through the recess and into the body to block the movable spigot. This movable spigot can take the form of a bolt slidable along the body and having a radial projection accessible from the recess. This projection can then engage with its side outer surface with the locking member which may be a solid block of generally rectangular shape. Preferably however the locking member is contained wholly within the body and has a cross-sectional profile which matches the internal profile of the recess so as to substantially fill the interior of the body.

The invention may be understood more readily and various other features of the invention may become apparent from consideration of the following description.

BRIEF DESCRIPTION OF DRAWINGS

An embodiment of the invention will now be described, by way of example only, with reference to the accompanying drawing, wherein.

DESCRIPTION OF PREFERRED EMBODIMENT

Figure 1:
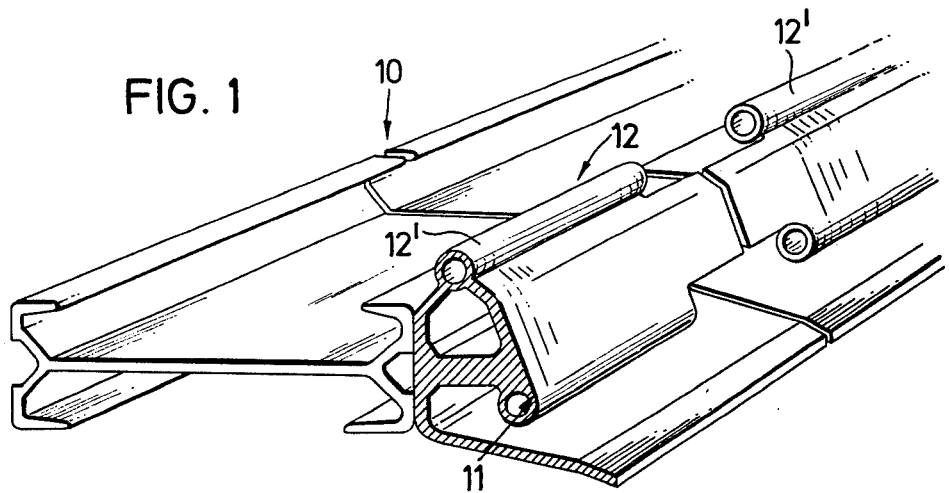
FIG. 1 is a perspective view of part of a scraper-chain conveyor.
Figure 2:
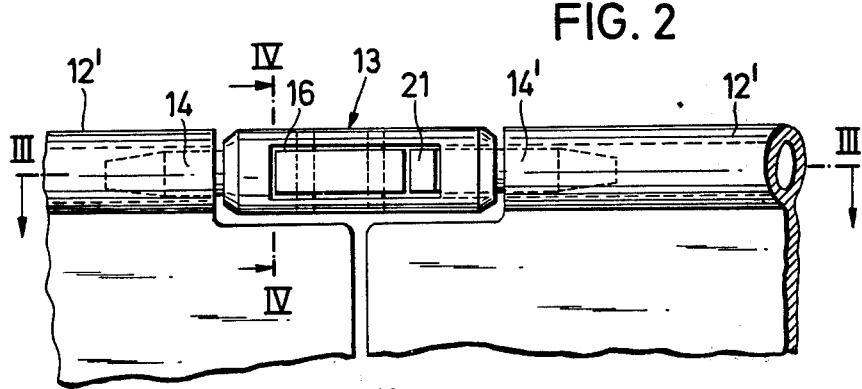
FIG. 2 is a plan view of a coupling device for use with the conveyor.
Figure 3:
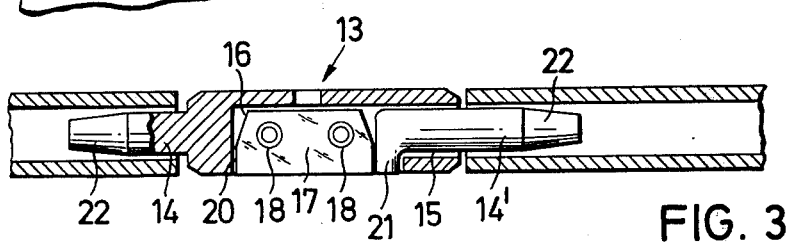
FIG. 3 is a sectional side view of the coupling device, the view being taken along the lines III—III of FIG. 2.
Figure 4:
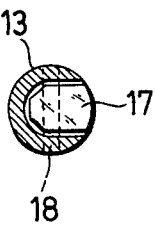
FIG. 4 is a cross-sectional view of the coupling device, the view being taken along the line IV—IV of FIG. 2.

FIG. 1 depicts part of a scraper-chain conveyor for use in mining where the scraper-chain assembly is omitted clarity. As is known the conveyor, denoted 10, is composed of a series of pans or channel sections arranged end-to-end and interconnected to permit a certain amount of limited articulation between their ends. Two such pans are shown in FIG. 1. On the mineral face side of the pans or channel sections there is a guide 12 for supporting and guiding a machine such as a plough (not shown). The guide is itself composed of shaped components 11 each attached to the mineral face side of one of the channel sections. The components 11 have tubular portions 12' at their upper ends which combine to form a guide track or rail. In accordance with the invention the connection means is used to interconnect the tubular portions 12' of the component 11 so as to permit the aforementioned articulation between the individual channel sections while preserving the stepless continuity of the guide rail. This connection means is composed of coupling device interconnecting the components 11 of adjacent channel section ends. As shown in FIGS. 2 – 4, each coupling device has a cylindrical hollow body 13 which has a diameter matching that of the tubular portions 12' associated therewith. Spigots 14,14' project axially outwardly from the ends of the body 13 and locate within these tubular portions 12'. One spigot 14 is fixed and formed integrally with the body 13 while the other spigot 14' is a separate movable bolt-like structure slidably received within an internal bore 15 of the body 13. The spigots 14,14' have tapered reduced diameter outer end portions 22. A slot or recess 16 in the wall of the body 13 communicates with the bore 15 and receives a lateral end projection 21 of the spigot 14'. A detachable locking member 17 is also receivable in the recess 16 to lock the spigot 14' in position. The member 17 can be inserted into or withdrawn from the recess 16 and has a cross-section matching the inner defining surfaces of the body 13 as shown in FIG. 4. To secure the member 17 in position bolts or more preferably cotter pins or sleeves 18 are inserted through aligned holes in the body 13 and the member 17. The elements 18 inserted in these holes can be designed to have a certain sheer strength permitting them to fracture if the loading becomes unacceptably high.

The device as described can be used as follows: presents

The member 17 is removed from the body 13 and the spigot 14' is retracted therein so that its projection 21 abuts on the left-hand side of the recess 16 in FIGS. 2 and 3. The body 13 can now be introduced into the gap between the tubular portions 12,12' of the components 11 of adjacent channel sections with the spigot 14 locating in the one tubular portion 12'. The body 13 can then be aligned with the other portion 12' and the spigot 14' extended, by sliding its projection 21 to the right-hand side of FIGS. 2 and 3, to penetrate the portion 12'. The member 17 is now inserted into the recess 16 to secure the spigot 14' and the elements 18 are located to retain the member 17. As shown in FIG. 3 the locking member 17 engages on the left-hand side face of the recess 16 and on the end face of the projection 21 and has a thickness substantially matching the height of the recess 16 (FIG. 4). The member 17 is thus adequately supported.

The clearance between the internal surface of the portion 12,12' and the spigots 14,14' therein is designed to permit horizontal and vertical displacement of the conveyor channel section ends within a permitted range. Where it is designed to remove the coupling device the pins or sleeves 18 are removed, perhaps with the aid of a punch, to permit the withdrawal of the member 17 and the retraction by sliding of the spigot 14'.

I claim:

1. In a scraper-chain mine conveyor having a plurality of independent channel sections arranged end-to-end and interconnected, each channel section having a guide rail affixed along the length of one of its sides to support a machine movable along the conveyor, an improved guide rail and removable guide rail spanning means for smoothly bridging the changing gap between adjacent guide rails comprising:

(a) each guide rail having a tubular portion disposed lengthwise thereon, each said tubular portion being shorter than its respective guide rail, each said tubular portion having end openings recessed from the leading and trailing ends of the guide rail;

(b) guide rail spanning means including a plurality of spanning devices each having a body of approximately the same cross-sectional shape and size as the exterior of said tubular portion;

(c) each said body having two axially aligned and oppositely extending spigots, each said spigot having a smaller cross-sectional size than the interior of said tubular portion, at least one of said spigots being axially movable between an operative position extending substantially out of said body and an inoperative position retracted substantially into said body, said spanning device having a reduced overall length in the inoperative position;

(d) each said spanning device having an extension means associated with said movable spigot to maintain said movable spigot in its extended operative position; and (e) each said spanning device being inserted between two adjacent guide rails, one of said spigots extending telescopically into said tubular portion of one guide rail, said extension means adjustably permitting the other of said spigots to first move axially to its retracted inoperative position within said body to reduce the overall length of said spanning device and to align said other spigot with said tubular portion of the adjacent guide rail, said extension means adjustably permitting said other spigot to then axially move to and be maintained in its extended operative position telescoped into said tubular portion of the adjacent guide rail to smoothly bridge the changing gap between and axially align the adjacent guide rail tubular portions.

2. The device of claim 1 wherein said guide rail tubular portion is located lengthwise along the upper edge of the guide rail.

3. The device of claim 1 wherein one of said spigots is fixed in its extended position relative to said body.

4. The device of claim 3 wherein said fixed spigot is integral with said body.

5. The device of claim 1 wherein said extension means includes a locking member having a locked position in which said movable spigot is maintained in its extended operative position, said locking member also having an unlocked position in which said movable spigot is permitted to move from an extended operative position to a retracted inoperative position.

6. The device of claim 5 wherein said locking member is manually inserted into and affixed to said body to wedge said movable spigot in its extended operative position, and said locking member is manually removed from said body to permit said movable spigot to freely move to its retracted inoperative position.

7. The device of claim 1 wherein each said spanning device, when maintained within adjacent guide rail tubular portions, has a selected size and shape suitable for smoothly spanning the adjacent guide rails to maintain their functional continuity.

8. The device of claim 1 wherein said two spigots each have tapered free end portions.

9. For use with a mine conveyor which has a plurality of channel sections arranged end-to-end, an improved guide for a machine movable along the conveyor, said guide comprising a plurality of shaped components each of which is associated with a respective section of the conveyor, each of said shaped components having a tubular portion to its upper end, a connector joining together each adjacent pair of said shaped components, each said connector having two spigots engageable in said tubular portions of each adjacent pair of said shaped components, at least one of said spigots being displaceable in relation to the other of said spigots to permit said connector to be reduced in overall length to facilitate introduction of said connector between said tubular portions and to permit said displaceable spigot to be engaged into one of said tubular portions when said connector has been so introduced, and each said connector being provided with a detachable locking member to secure said displaceable spigot when engaged in said tubular portion associated therewith.

10. For use with a scraper-chain mine conveyor having a plurality of independent channel sections arranged end-to-end and interconnected, each channel section having a guide rail affixed along the length of one of its sides to support a machine movable along the conveyor, each guide rail having a tubular portion disposed lengthwise thereon, each tubular portion being shorter than its respective guide rail, each tubular portion having end openings recessed from the leading and trailing ends of the guide rail, removable guide rail spanning means for smoothly bridging the changing gap between adjacent guide rails comprising:
(a) said guide rail spanning means including a plurality of spanning devices each having a body of approximately the same cross-sectional shape and size as the exterior of the guide rail tubular portion;
(b) each said body having two axially aligned and oppositely extending spigots, each said spigot having a smaller cross-sectional size than the interior of the guide rail tubular portion, at least one of said spigots being axially movable between an operative position extending substantially out of said body and an inoperative position retracted substantially into said body, said spanning device having a reduced overall length in the inoperative position;
(c) each said spanning device having an extension means associated with said movable spigot to maintain said movable spigot in its extended operative position; and
(d) said spanning device being inserted between two adjacent guide rails, one of said spigots extending telescopically into the tubular portion of one guide rail, said extension means adjustably permitting the other of said spigots to first move axially to its retracted inoperative position within said body to reduce the overall length of said spanning device and to align said other spigot with the tubular portion of the adjacent guide rail, said extension means adjustably permitting said other spigot to then axially move to and be maintained in its extended operative position telescoped into the tubular portion of the adjacent guide rail to smoothly bridge the changing gap between and axially align the adjacent guide rail tubular portions.

11. The device of claim 10 wherein one of said spigots is fixed in its extended position relative to said body.

12. The device of claim 11 wherein said fixed spigot is integral with said body.

13. The device of claim 10 wherein said extension means includes a locking member having a locked position in which said movable spigot is maintained in its extended operative position, said locking member also having an unlocked position in which said movable spigot is permitted to move from an extended operative position to a retracted inoperative position.

14. The device of claim 13 wherein said locking member is manually inserted into and affixed to said body to wedge said movable spigot in its extended operative position, and said locking member is manually removed from said body to permit said movable spigot to freely move to its retracted inoperative position.

15. The device of claim 10 wherein each said spanning device, when maintained within adjacent guide rail tubular portions, has a selected size and shape suitable for smoothly spanning the adjacent guide rails to maintain their functional continuity.

16. The device of claim 10 wherein said two spigots each have tapered free end portions.

17. A coupling device for interconnecting spaced-apart hollow portions of a guide formed at one side of a conveyor; said device comprising an elongate body, spigots projecting axially from the ends of the body and receivable in the hollow portions, at least one of the spigots being movable axially in relation to the body to facilitate entry of the device between the portions, and detachable locking means for fixing the movable spigot against axial movement when located in its associated hollow portion.

* * * * *